(12) United States Patent
Gupta et al.

(10) Patent No.: US 11,399,054 B2
(45) Date of Patent: Jul. 26, 2022

(54) METHOD AND SYSTEM FOR PROFILING TELECONFERENCE SESSION QUALITY IN COMMUNICATION NETWORKS

(71) Applicant: Arista Networks, Inc., Santa Clara, CA (US)

(72) Inventors: Karan Gupta, Pune (IN); Gopinath Krishnamurthy, Pune (IN); Nilaysinh Thakor, Pune (IN)

(73) Assignee: Arista Networks, Inc., Santa Clara, CA (US)

( * ) Notice: Subject to any disclaimer, the term of this patent is extended or adjusted under 35 U.S.C. 154(b) by 75 days.

(21) Appl. No.: 16/698,299

(22) Filed: Nov. 27, 2019

(65) Prior Publication Data

US 2020/0177662 A1 Jun. 4, 2020

Related U.S. Application Data

(60) Provisional application No. 62/773,160, filed on Nov. 29, 2018.

(51) Int. Cl.
*H04L 65/80* (2022.01)
*G06N 20/10* (2019.01)
*H04L 43/08* (2022.01)
*H04L 65/403* (2022.01)

(52) U.S. Cl.
CPC ........... *H04L 65/80* (2013.01); *G06N 20/10* (2019.01); *H04L 43/08* (2013.01); *H04L 65/403* (2013.01)

(58) Field of Classification Search
None
See application file for complete search history.

(56) References Cited

U.S. PATENT DOCUMENTS

| | | | | |
|---|---|---|---|---|
| 8,441,955 | B2 * | 5/2013 | Wilkinson | H04N 21/2402 370/252 |
| 9,621,853 | B1 * | 4/2017 | Yang | H04L 65/403 |
| 2008/0104228 | A1 * | 5/2008 | Dacosta | H04L 65/80 709/224 |
| 2009/0034426 | A1 * | 2/2009 | Luft | H04L 41/509 370/252 |
| 2012/0140624 | A1 * | 6/2012 | Denman | H04L 43/0882 370/230.1 |
| 2018/0020037 | A1 * | 1/2018 | Ali | H04L 65/80 |
| 2020/0022016 | A1 * | 1/2020 | Fenoglio | H04L 41/16 |

* cited by examiner

*Primary Examiner* — Scott B Christensen
(74) *Attorney, Agent, or Firm* — Chamberlain, Hrdlicka, White, Williams & Aughtry

(57) ABSTRACT

A method and system for profiling teleconference session quality in communication networks. Specifically, the disclosed method and system entail providing classifications labeling teleconference session quality using a classification model. The classification model may produce these aforementioned quality classifications based on the ingestion of features extracted from teleconference session network traffic, which may have traversed through sampling network device(s) positioned in the network traffic path of the teleconference session between client devices.

19 Claims, 4 Drawing Sheets

METHOD AND SYSTEM FOR PROFILING TELECONFERENCE SESSION QUALITY IN COMMUNICATION NETWORKS

CROSS-REFERENCE TO RELATED APPLICATIONS

This application claims priority under 35 U.S.C. § 119(e) to U.S. Provisional Patent Application 62/773,160, filed on Nov. 29, 2018, which is incorporated herein by reference in its entirety.

BACKGROUND

The quality of experience perceived by users of teleconferencing applications and/or services often depends on the health of the underlying communication network. For example, network traffic enabling the teleconference sessions may be susceptible to losses, errors, latencies, buffer overflows, and other impairments while traversing the communication network.

DETAILED DESCRIPTION

Figure 1:
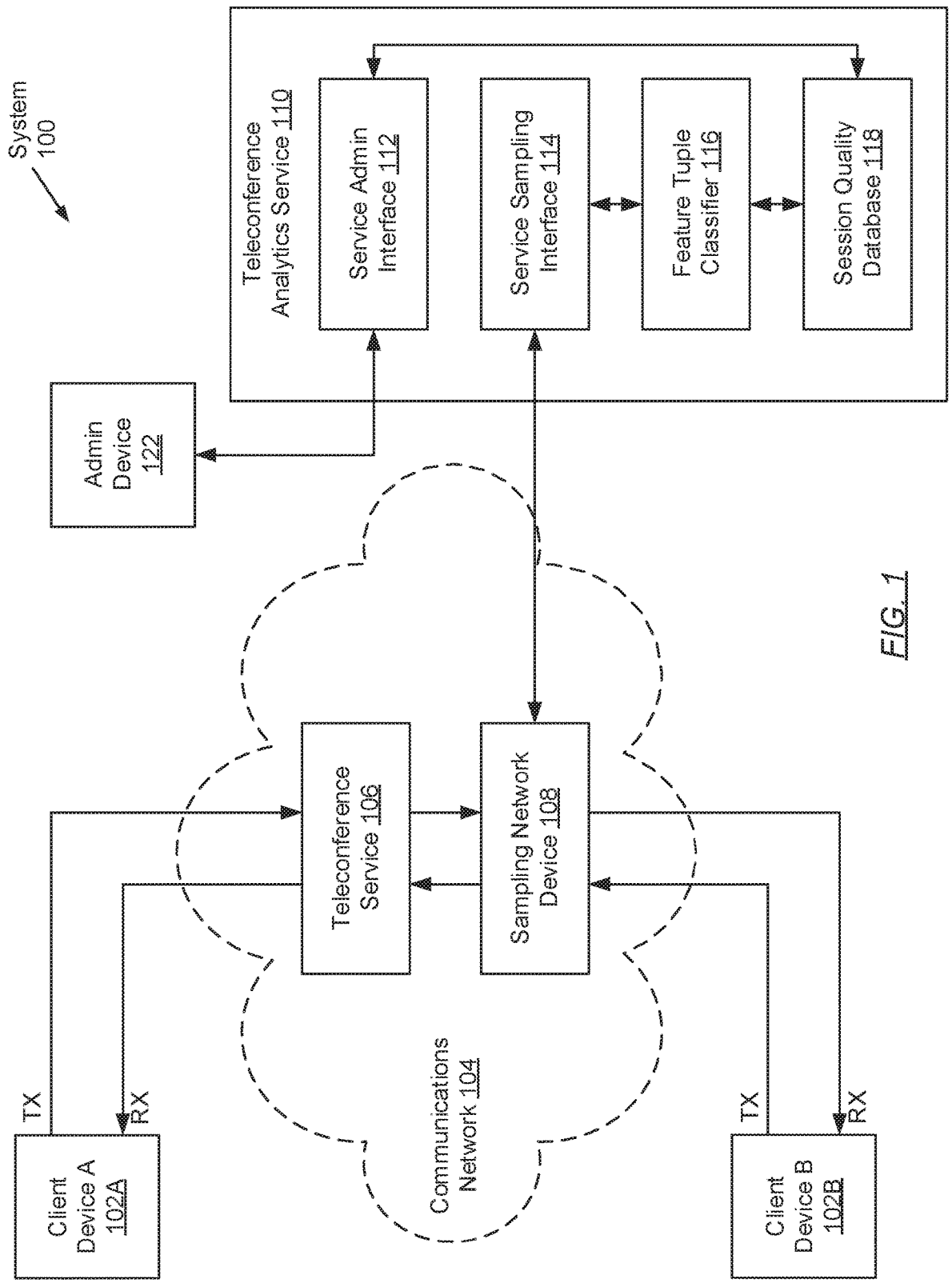
FIG. 1 shows a system in accordance with one or more embodiments of the invention.

In general, in one aspect, the invention relates to a method for profiling teleconference session quality. The method includes inspecting a first teleconference session segment of a teleconference session to obtain a first feature tuple, processing the first feature tuple using a classification learning model to obtain a first quality classification, and providing, to an admin device, overall teleconference session metrics for the teleconference session based at least on the first quality classification.

In general, in one aspect, the invention relates to a system. The system includes an admin device including a first computer processor, and a teleconference analytics service operatively connected to the admin device, and including a second computer processor programmed to obtain a feature tuple for a teleconference session segment of a teleconference session, process the feature tuple using a classification learning model to obtain a quality classification, and provide, to the admin device, overall teleconference session metrics for the teleconference session based at least on the quality classification.

In general, in one aspect, the invention relates to a non-transitory computer readable medium (CRM). The non-transitory CRM includes computer readable program code, which when executed by a computer processor, enables the computer processor to inspect a first teleconference session segment of a teleconference session to obtain a first feature tuple, process the first feature tuple using a classification learning model to obtain a first quality classification, and provide, to an admin device, overall teleconference session metrics for the teleconference session based at least on the first quality classification.

Other aspects of the invention will be apparent from the following description and the appended claims.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connecting the operatively connected components) connection.

In general, embodiments of the invention relate to a method and system for profiling teleconference session quality in communication networks. Specifically, one or more embodiments of the invention entails providing classifications labeling teleconference session quality using a classification model. The classification model may produce these aforementioned quality classifications based on the ingestion of features extracted from teleconference session network traffic, which may have traversed through sampling network device(s) positioned in the network traffic path of the teleconference session between client devices.

FIG. 1 shows a system in accordance with one or more embodiments of the invention. The system (100) may include a pair of client devices (102A, 102B) operatively connected to one another through a communications network (104), which may include, but is not limited to, a teleconference service (106) and a sampling network device (108). The sampling network device (108), in turn, may operatively connect to a teleconference analytics service (110), which may also operatively connect to an admin device (122). Each of these system (100) components is described below.

In one embodiment of the invention, a client device (102A, 102B) may represent any physical computing system designed and configured to receive, generate, process, store, and/or transmit data, as well as to provide an environment in which one or more computer programs (e.g., applications) (not shown) may execute thereon. The computer program(s), for example, may be directed to implementing network teleconferencing (described below). Further, in providing an execution environment for the computer program(s) installed thereon, a client device (102A, 102B) may include and allocate various resources (e.g., computer processors, memory, storage, virtualization, network bandwidth, etc.), as needed, to the computer program(s) and their respective workloads instantiated thereon. One of ordinary skill will appreciate that a client device (102A, 102B) may perform other functionalities without departing from the scope of the invention. Examples of a client device (102A, 102B) may include, but are not limited to, a desktop computer, a laptop computer, a smartphone, a tablet computer, a smart television, or any other computing system similar to the exemplary computing system shown in FIG. 4.

In one embodiment of the invention, network teleconferencing may refer to the real-time exchange of information between at least a pair of client devices (102A, 102B) being operated by users which may or may not be occupying the same physical space. Network teleconferencing may be facilitated through an underlying communications network (104) that may operatively connect the client devices (102A, 102B). Further, network teleconferencing may include, but is not limited to, telephone (or audio) conferencing, video conferencing, and augmented reality conferencing between parties.

In one embodiment of the invention, each instance of network teleconferencing between at least a pair of client devices (102A, 102B) may be referred to as a teleconference session. In turn, any given teleconference session may be logged in terms of sample points (also referred to as teleconference session segments), which may represent temporal partitions (e.g., thirty second time intervals) of the teleconference session. Further, examples of applications and/or services that may be employed by the client devices (102A, 102B) to exercise network teleconferencing may include, but are not limited to, Skype, Skype for Business, Microsoft Teams, Slack, Google Hangout, Google Hangout Chat, Cisco WebEx, and GoToMeeting.

In one embodiment of the invention, the communications network (104) may represent a collection of interconnected network devices (described below) and/or other systems (e.g., teleconference service (106)), which may form at least a portion of a local area network (LAN), a wide area network (WAN) such as the Internet, or a combination thereof. Furthermore, the communications network (104) may collectively include functionality to facilitate communications (e.g., information exchange) at least between the client devices (102A, 102B). These communications may employ any combination of wired and/or wireless networking communication protocols.

In one embodiment of the invention, the teleconference service (106) may represent backend infrastructure for enabling network teleconferencing (described above) for a particular teleconference application. The teleconference service (106) may include functionality to: operate as a switchboard for interconnecting multiple client devices (102A, 102B) to any given teleconference session; and manage the real-time exchange of information between client devices (102A, 102B) during any given teleconference session. One of ordinary skill will appreciate that the teleconference service (106) may perform other functionalities without departing from the scope of the invention.

In one embodiment of the invention, the teleconference service (106) may be implemented using one or more servers (not shown). Each server may represent a physical server that may reside in a datacenter, or a virtual server, which may alternatively reside in a cloud computing environment. Additionally or alternatively, the teleconference service (106) may be implemented using one or more computer systems similar to the exemplary computing system shown in FIG. 4.

In one embodiment of the invention, a network device (e.g., the sampling network device (108)) may represent any physical device that may include persistent storage, memory (e.g., random access memory (RAM), shared memory, etc.), one or more computer processors (including a switch chip or network processor), and two or more physical network interfaces (also referred to as physical network ports). Further, a network device may include functionality to receive network traffic (e.g., protocol data units (PDUs)) via one or more ingress network interfaces, and determine whether to: (i) drop the network traffic; (ii) process the network traffic based on a configuration and/or instructions executing thereon; and/or (iii) transmit the network traffic, based on the processing, out one or more egress network interfaces towards a destination.

In one embodiment of the invention, the persistent storage on a network device may include any type of non-transitory computer readable medium that includes instructions, which when executed by the computer processor(s) on the network device, enable the network device to perform any of the functionalities described herein. Moreover, examples of a network device may include, but are not limited to, a switch, a router, and a multilayer switch. Further, a network device is not limited to the aforementioned specific examples.

In one embodiment of the invention, a network device may process network traffic based, at least in part, on whether the network device is a layer-2 (L2) switch or a layer-3 (L3) switch (also referred to as a multilayer switch), which may perform at least some functions of a router. If the network device operates as a L2 switch, the network device may use a destination media access control (MAC) address along with a forwarding table or policy to determine out of which network interface to transmit network traffic. On the other hand, if the network device operates as a L3 switch, the network device may use a destination Internet Protocol (IP) address along with a routing table or policy to determine out of which network interface to transmit network traffic, and may include the ability to write the MAC address of a next-hop device to receive the network traffic in place of its own MAC address (which a previous-hop device to transmit the network traffic wrote) in the L2 information encapsulating the network traffic. Further, if the network device operates as a multilayer switch, the network device may include functionality to process network traffic using both MAC addresses and IP addresses.

In one embodiment of the invention, the sampling network device (108) may represent a network device that may include further functionality to carry out network traffic sampling. Specifically, network traffic (also referred to as a network traffic flow), which may be sampled by the sampling network device (108), may be directed to a teleconference (or teleconferencing) session (described above) transpiring between the client devices (102A, 102B). More specifically, the aforementioned teleconferencing session network traffic may be sampled periodically, throughout the elapsed session time of a given teleconferencing session, to extract and/or derive various teleconference session features (described below) pertinent to profiling teleconference session quality. To that extent, the sampling network device (108) may perform at least a portion of the various steps outlined below with respect to FIG. 2. One of ordinary skill will appreciate that the sampling network device (108) may perform other functionalities without departing from the scope of the invention.

In one embodiment of the invention, a teleconference session feature (also referred generically as a feature) may represent an individual measurable property or indicator reflective of the sampled teleconferencing session network traffic. Examples of a teleconference session feature may include, but are not limited to, a bit rate, a packet rate, a bit rate jitter, a packet rate jitter, any derivatives (e.g., average, standard deviation, etc.) thereof, a transport layer protocol (e.g., transmission control protocol (TCP), user datagram protocol (UDP), etc.) being employed, an inter-packet gap (i.e., a time span between PDUs of a network traffic flow), a retransmission rate (applicable only to TCP network traffic), and a window (or receive buffer) size (applicable only to TCP network traffic). A teleconference session feature is not limited to the aforementioned examples.

In one embodiment of the invention, the teleconference analytics service (110) may represent a physical and/or logical intelligence designed and configured to facilitate network traffic analytics for certain network traffic traversing the communications network (104) (i.e., teleconference session network traffic exchanging between the client devices (102A, 102B)). Particularly, the teleconference analytics service (110) may include functionality to apply a classification learning model to profile teleconference session quality (see e.g., FIG. 2). One of ordinary skill will appreciate that the teleconference analytics service (110) may perform other functionalities without departing from the scope of the invention.

In one embodiment of the invention, the teleconference analytics service (110) may be implemented using one or more servers (not shown). Each server may represent a physical server that may reside in a datacenter, or a virtual server, which may alternatively reside in a cloud computing environment. Additionally or alternatively, the teleconference analytics service (110) may be implemented using one or more computer systems similar to the exemplary computing system shown in FIG. 4. Furthermore, the teleconference analytics service (110) may include a service admin interface (112), a service sampling interface (114), a feature tuple classifier (116), and a session quality database (118). Each of these teleconference analytics service (110) subcomponents is described below.

In one embodiment of the invention, the service admin interface (112) may refer to a logical interface or interactivity protocol, which may facilitate communications between the teleconference analytics service (110) and the admin device (122). To that extent, the service admin interface (112) may include functionality to: retrieve data recorded in the session quality database (118); and implement a graphical user interface (GUI), an application programming interface (API), or any other interface through which the retrieved data may be provided or presented to network administrators operating the admin device (122). The provided or presented data may disclose analytics (e.g., teleconference session details, quality classification, and root cause analysis for poor performing segments of the teleconference session) (also referred collectively as overall session metrics) descriptive of one or more teleconferencing sessions. Further, one of ordinary skill will appreciate that the service admin interface (112) may perform other functionalities without departing from the scope of the invention.

In one embodiment of the invention, the service sampling interface (114) may refer to a logical interface or interactivity protocol, which may facilitate communications between the teleconference analytics service (110) and the sampling network device (108). To that extent, the service sampling interface (114) may include functionality to: receive feature tuples and teleconference session segment metadata (e.g., teleconference session identifier, teleconference session segment identifier, flow directionality, sampling timestamp, teleconference application name, etc.) for one or more teleconference sessions from the sampling network device (106); generate session segment records, to be maintained in the session quality database (116), using at least the received feature tuples and teleconference session segment metadata; and delegate feature tuples to the feature tuple classifier (116) for processing. Further, one of ordinary skill will appreciate that the service sampling interface (114) may perform other functionalities without departing from the scope of the invention.

In one embodiment of the invention, the feature tuple classifier (116) may refer to a computer program that may execute on the underlying hardware of the teleconference analytics service (110). Specifically, the feature tuple classifier (116) may be responsible for analyzing (or processing) feature tuples—i.e., each representative of a collection of teleconferencing session feature values for a given teleconference session segment. To that extent, the feature tuple classifier (116) may include functionality to: obtain feature tuples from the service sampling interface (114); analyze or process the feature tuples using a trained classification learning model, to obtain quality classifications reflective of the quality of respective teleconference session segments; and update the appropriate session segment records, maintained in the session quality database (118), using the quality classifications. Further, one of ordinary skill will appreciate that the feature tuple classifier (116) may perform other functionalities without departing from the scope of the invention.

In one embodiment of the invention, a quality classification may refer to a numerical or categorical label reflecting the quality of a teleconference session and/or teleconference session segment. Further, a quality classification may be expressed as one of two possible numerical or categorical labels should dual-class classification be employed. For example, the quality of a teleconference session and/or teleconference session segment may be reflected through a "BAD" or "GOOD" categorical label (or a "0" or "1" numerical label, respectively) representative of the quality classification. Alternatively, a quality classification may be expressed as one of multiple (i.e., more than two) possible numerical or categorical labels should multi-class classification be employed. For example, the quality of a teleconference session and/or teleconference session segment may be reflected through a "PLATINUM", "GOLD", "SILVER", and "BRONZE" categorical label (or a similar numerical scale) representative of the quality classification.

In one embodiment of the invention, the session quality database (118) may refer to a data repository for storing various information concerning one or more teleconference sessions (or more specifically, information pertinent to profiling teleconference session quality). By way of an example, the information reflective of a given teleconference session may be maintained within one or more database entries (also referred to as teleconference session segment records). In turn, each session segment record may include any subset of, but is not limited to, the following information: a teleconference application name associated with a teleconferencing application and/or service; a teleconference session identifier assigned to uniquely identify a given teleconference session; a session segment identifier assigned to uniquely identify a given session segment (i.e., a teleconferencing session network traffic sample point) of the given teleconference session; a labeled feature tuple (including a set of teleconference session features and a corresponding quality classification) for the given session segment; a sampling timestamp encoding a date and/or time during which teleconference session network traffic had been sampled for the given session segment; and a network traffic flow directionality (e.g., receiving (RX) or transmitting (TX)) reflecting a direction of network traffic with reference to a given client device (102A, 102B). Information stored in the session quality database (118) is not limited to the aforementioned examples.

In one embodiment of the invention, the session quality database (118) may be implemented using one or more physical storage devices (not shown). Each physical storage device may include non-transitory computer readable media on which information may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the physical storage devices may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the admin device (122) may represent any physical computing system operated by one or more administrators of at least a portion of the communications network (104). An administrator may refer to an individual or entity whom may be responsible for overseeing at least a portion of communication network (104) operations and maintenance. Further, the admin device (122) may include functionality to: interact with the teleconference analytics service (110) by receiving overall teleconference session metrics reflective of teleconference sessions facilitated through at least a portion of the communications network (104). One of ordinary skill will appreciate that the admin device (122) may perform other functionalities without departing from the scope of the invention. Examples of the admin device (122) may include, but are not limited to, a desktop computer, a laptop computer, a tablet computer, a workstation computer, a server, a mainframe, a smartphone, or any other computing system similar to the exemplary computing system shown in FIG. 4.

While FIG. 1 shows a configuration of components, other system (100) configurations may be used without departing from the scope of the invention. For example, in one embodiment of the invention, the system (100) may further include one or more additional client devices (not shown) and/or one or more additional sampling network devices (not shown). In another embodiment of the invention, the system (100) may further include one or more additional and different teleconference services (not shown). In yet another embodiment of the invention, at least a subset of the teleconference analytics service (110) (e.g., the feature tuple classifier (116), the session quality database (118), and/or the service admin interface (112)) may alternatively reside and perform their respective functionalities on the sampling network device (108) (or each sampling network device (not shown) distributed across the communications network (104)) rather than be implemented as an external service operatively connected to the sampling network device (108) as shown above in FIG. 1. In such an embodiment, the service sampling interface (114) may not necessarily exist. Furthermore, though FIG. 1 shows that the sampling network device (108) resides between the teleconference service (106) and one of the client devices (102B), in one or more other embodiments of the invention, the sampling network device (108) may alternatively reside between the teleconference service (106) and the other client device (102A) or any other additional client device (not shown).

Figure 2:
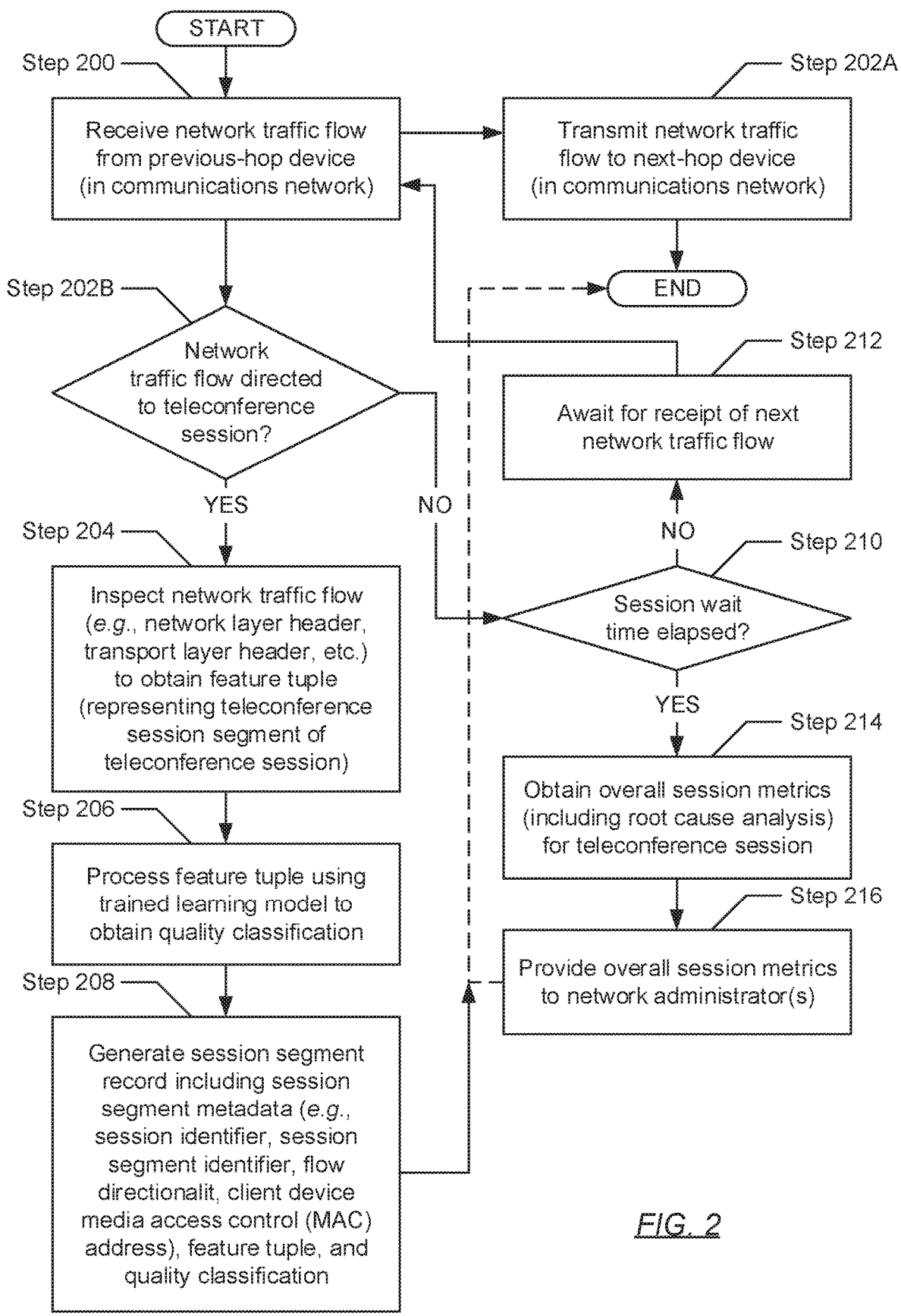
FIG. 2 shows a flowchart describing a method for profiling teleconference session quality in accordance with one or more embodiments of the invention.

FIG. 2 shows a flowchart describing a method for profiling teleconference session quality in accordance with one or more embodiments of the invention. While the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a network traffic flow is received by a sampling network device (see e.g., FIG. 1) and from a previous-hop device. In one embodiment of the invention, the network traffic flow may refer to a sequence of protocol data units (PDUs) (e.g., frames, packets, messages, datagrams, etc.) being communicated from one client device (i.e., a source client device) to at least another (i.e., at least one destination client device). Further, the previous-hop device may represent the source client device, another network device of the communications network in the network traffic flow path towards the destination client device(s), or a teleconference service.

In Step 202A, the network traffic flow (received in Step 200) is forwarded/transmitted to a next-hop device. In one embodiment of the invention, the next-hop device may represent the destination client device, another network device of communications network in the network traffic flow path towards the destination client device, or a teleconference service.

In Step 202B, occurring concurrently with Step 202A (described above), a determination is made as to whether the network traffic flow (received in Step 200) is directed to a teleconference session. The determination may entail examining a source or destination Internet Protocol (IP) address embedded amongst header information of one or more PDUs of the network traffic flow. That is, the source or destination IP address may or may not pertain to a teleconference service from which the network traffic flow had been received or to which the network traffic flow should be forwarded next, respectively. Should the source or destination IP address belong to a known teleconference service, then the network traffic flow is directed to a teleconference session. Furthermore, in one embodiment of the invention, if it is determined that the network traffic flow is directed to a teleconference session, then the process proceeds to Step 204. On the other hand, in another embodiment of the invention, if it is alternatively determined that the network traffic flow is not directed to a teleconference session, then the process alternatively proceeds to Step 210.

In Step 204, upon determining (in Step 202B) that the network traffic flow (received in Step 200) is directed to a teleconference session, the network traffic flow is inspected. In one embodiment of the invention, inspection of the network traffic flow may entail examining and/or extracting information from header (e.g., data link layer, network layer header, transport layer header, etc.) information in one or more PDUs of the network traffic flow. Further, from at least the aforementioned header information, a feature tuple for a teleconference session segment may be obtained. The feature tuple may refer to a collection (e.g., an array or a vector) of values—each representative of a different feature (i.e., teleconference session feature (described above)) pertinent to discerning teleconference session quality. Moreover, the inspection may be performed by a sampling network device (see e.g., FIG. 1).

In Step 206, the feature tuple (obtained in Step 204) is processed. In one embodiment of the invention, processing of the feature tuple may transpire on the sampling network device which had inspected the network traffic flow (i.e., the feature tuple classifier resides on the sampling network device). In another embodiment of the invention, processing of the feature tuple may be offloaded to an external teleconference analytics service operatively connected to the sampling network device, where the feature tuple classifier resides on the external teleconference analytics service. Furthermore, the feature tuple may be processed using a trained classification learning model (described below) (see e.g., FIG. 3). Processing of the feature tuple, using the trained classification learning model, may produce a quality classification—i.e., a numerical or categorical label reflecting the quality of a teleconference session and/or teleconference session segment (further described above) (see e.g., FIG. 1).

In Step 208, a session segment record is generated and/or updated. In one embodiment of the invention, the session segment record may represent a database entry that may be maintained on the session quality database. The session quality database may reside, at least in part, on the sampling network device; and/or may reside, at least in part, on an external teleconference analytics service operatively connected to the sampling network device. Further, the session segment record may include, but is not limited to, teleconference session segment metadata describing the given teleconference session segment, the feature tuple (obtained in Step 204), and the quality classification (obtained in Step 206).

In one embodiment of the invention, teleconference session segment metadata may include any subset of, but is not limited to, the following information: a teleconference application name associated with a teleconferencing application and/or service; a teleconference session identifier assigned to uniquely identify the given teleconference session; a session segment identifier assigned to uniquely identify the given session segment (i.e., a teleconferencing session network traffic sample point) of the given teleconference session; a sampling timestamp encoding a date and/or time during which teleconference session network traffic had been sampled for the given session segment; a network traffic flow directionality (e.g., receiving (RX) or transmitting (TX)) reflecting a direction of network traffic with respect to a reference device; and a client device media access control (MAC) address associated with a client device (102A, 102B). Further, the aforementioned reference device may refer to the client device that had initiated the connection and/or teleconference session, the client device that had received the connection request, or any other client device affiliated with the given teleconference session.

In Step 210, upon alternatively determining (in Step 202B) that the network traffic flow (received in Step 200) is not directed to a teleconference session, a determination is made as to whether a session wait time has elapsed. A session wait time may refer to a preselected span (or threshold) of time that may be allowed to elapse before concluding that a teleconference session has terminated. Accordingly, in one embodiment of the invention, if it is determined that the session wait time has elapsed, then it may be concluded that the teleconference session has terminated, and the process proceeds to Step 214. On the other hand, if it is alternatively determined that the session wait time has yet elapse, then it may be alternatively concluded that the teleconference session has yet to be terminated, and the process alternatively proceeds to Step 212.

In Step 212, upon determining (in Step 210) that the session wait time has yet to elapse for the given teleconference session, other operations and/or functionalities may be performed until a next network traffic flow is received. Hereinafter, the process proceeds to Step 200.

In Step 214, upon alternatively determining (in Step 210) that the session wait time has elapsed for the given teleconference session, overall session metrics are obtained. Specifically, in one embodiment of the invention, a lookup on the session quality database may be performed to identify one or more database entries (or session segment records) maintained therein. The identified set of session segment records may pertain to the given teleconference session and, accordingly, may reflect information captured, derived, and/or obtained as various sample points for the given teleconference session, which may be pertinent to discerning a quality of the given teleconference session across various points-in-time.

Hereinafter, in one embodiment of the invention, the various information (e.g., teleconference session segment metadata, feature tuples, and quality classifications) stored across the set of session segment records may be aggregated. The overall session metrics may subsequently be represented through, or derived from, the above-aggregated various information. For example, a set of quality classifications may be extracted and, subsequently, used to derive a negative performance index reflective of the overall quality of the given teleconference session. The negative performance index may be expressed as a percentage of teleconference session segments (i.e., teleconference session sample points) that may have been labeled with a poor performance classification (e.g., a "bad" quality classification should dual-class classification be pursued, or a "bronze" quality classification should multi-class classification alternatively be pursued (further described above (see e.g., FIG. 1))). Furthermore, an overall session quality classification may be assigned to the given teleconference session overall based on a mode (i.e., a quality classification label that appears most often) of the set of quality classifications, or based on the negative performance index meeting or not meeting a prescribed index threshold (e.g., the overall session quality classification may be assigned the poor performance classification should the negative performance index meet or exceed an 80% value).

By way of another example, the overall session metrics may further include root cause analysis results. Root cause analysis may refer to a systematic process through which root causes for the negative performance index may be identified. In one embodiment of the invention, the root cause analysis may entail: mapping the set of network traffic flow directionalities to the set of quality classifications for the various teleconference session segments, respectively, of the given teleconference session; identifying a subset of the network traffic flow directionalities to the percentage of teleconference session segments labeled with the poor performance classification; and identifying a mode (i.e., a network traffic flow directionality that appears most often) of the subset of network traffic flow directionalities. The identified network traffic flow directionality mode may subsequently be used to determine whether the root cause for the negative performance index may be associated with an impairment (e.g., losses, errors, latencies, buffer overflows, etc.) on an underlying wired portion or alternatively, an underlying wireless portion, of the communications network.

Thereafter, in Step 216, the overall session metrics (obtained in Step 214) are provided or presented to network administrators. Specifically, in one embodiment of the invention, the overall session metrics may be disclosed through a graphical user interface (GUI), an application programming interface (API), or any other interface paradigm—e.g., command line interface (CLI).

Figure 3:
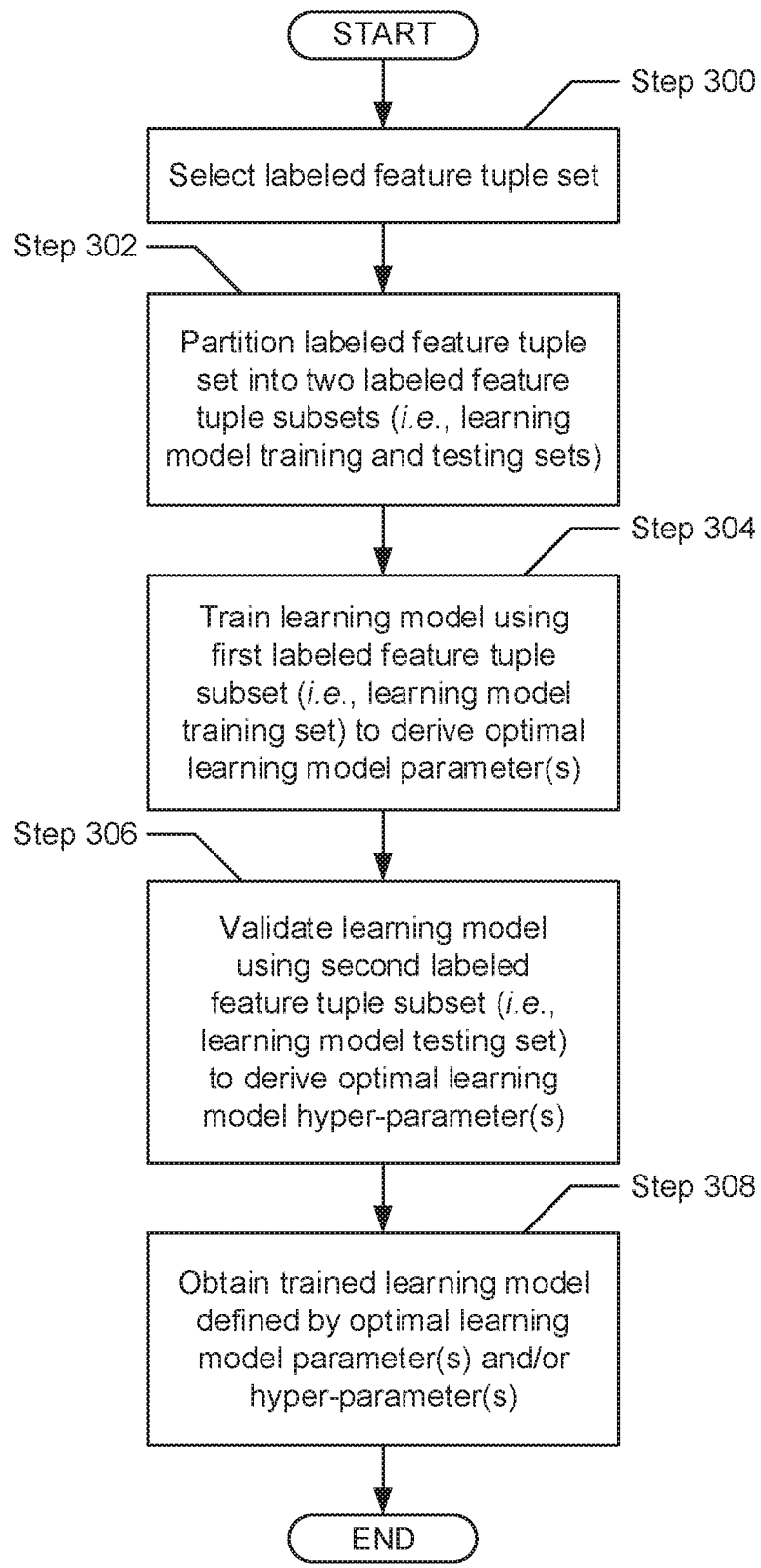
FIG. 3 shows a flowchart describing a method for training learning models in accordance with one or more embodiments of the invention.

FIG. 3 shows a flowchart describing a method for training learning models in accordance with one or more embodiments of the invention. The method outlined below may apply supervised learning, which may refer to the learning (or optimization) of classification learning models through the analyses of training examples and/or data. Further, the method outlined below may be performed at an offline site (i.e., outside the bounds of the system illustrated in FIG. 1). While the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a labeled feature tuple set is selected. In one embodiment of the invention, the labeled feature tuple set may encompass a collection of labeled feature tuples. Further, each labeled feature tuple may refer to a finite ordered list (or sequence) of elements. The elements may include, but are not limited to, a feature tuple (described above) (see e.g., FIG. 2) and a corresponding quality classification (described above) (see e.g., FIG. 1). Moreover, each labeled feature tuple may pertain to a different teleconference session segment for which the aforementioned elements have been previously captured, processed, and/or obtained.

In Step 302, the labeled feature tuple set (selected in step 300) is partitioned into two labeled feature tuple subsets. In one embodiment of the invention, a first labeled feature tuple subset may include a first portion of a cardinality (or number) of labeled feature tuples in the labeled feature tuple set, whereas a second labeled feature tuple subset may include a second portion (or remainder) of the cardinality of labeled feature tuples in the labeled feature tuple set. Further, the first labeled feature tuple subset may also be referred to as a learning model training set, while the second feature tuple subset may also be referred to as a learning model testing (or validation) set.

In one embodiment of the invention, the ratio of labeled feature tuples forming the first labeled feature tuple subset to labeled feature tuples forming the second labeled feature tuple subset may be determined based on administrator preferences. Specifically, the aforementioned preferences may include a parameter—e.g., a percentage of data for training (PDT) parameter—expressed through a numerical value that specifies the percentage of the labeled feature tuple set should be used for training learning model parameters (described below).

In Step 304, a classification learning model (e.g., an artificial neural network, a support vector machine, a decision tree, etc.) is trained using the first labeled feature tuple subset (i.e., the learning model training set) (obtained in Step 302). In one embodiment of the invention, training the learning model may result in the derivation of one or more optimal learning model parameters. A learning model parameter may refer to a model configuration variable that may be adjusted (or optimized) during a training runtime of the learning model. By way of an example, a learning model parameter, pertinent to a neural network based learning model, may include the set of weights representative of the connection strengths between pairs of nodes structurally defining the model.

In Step 306, the classification learning model (trained in Step 304) is validated using the second labeled feature tuple subset (i.e., the learning model testing set) (obtained in Step 302). In one embodiment of the invention, validating the learning model may result in the derivation of one or more optimal learning model hyper-parameters. A learning model hyper-parameter may refer to a model configuration variable that may be adjusted (or optimized) outside or before the training runtime of the learning model. That is, a learning model hyper-parameter may represent a variable directed to the architecture design of the learning model. By way of examples, learning model hyper-parameters, pertinent to a neural network based learning model, may include the number of hidden node layers and, accordingly, the number of nodes in each hidden node layer, between the input and output layers of the model; the activation function(s) used by the nodes of the model to translate their respective inputs to their respective outputs; the learning rate defining the speed of which the model updates its learning model parameter(s) (described above); and the number of iterations or epochs defining the length of the training runtime of the model.

In Step 308, a trained classification learning model is defined using the optimal learning model parameter(s) (derived in Step 304) and the optimal learning model hyper-parameter(s) (derived in Step 306). In one embodiment of the invention, the trained learning model may represent a tuned learning model inferred from example input-output pairs (e.g., the learning model training and testing sets), which may exhibit acceptable classification performance and accuracy.

Figure 4:
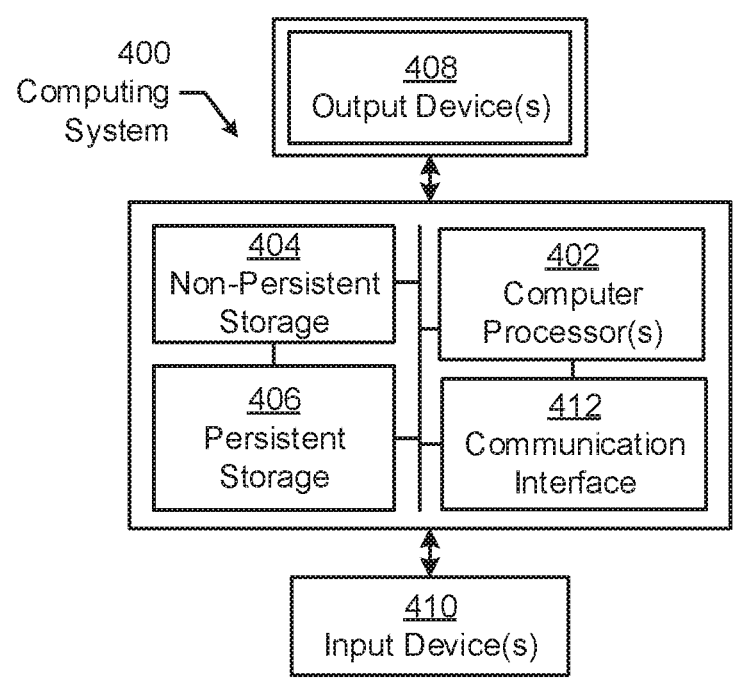
FIG. 4 shows an exemplary computing system in accordance with one or more embodiments of the invention.

FIG. 4 shows an exemplary computing system in accordance with one or more embodiments of the invention. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling teleconference session quality, comprising:
    receiving a network traffic flow from a network device connected to a network, wherein the network traffic flow is received during normal operation of the network;
    determining, in response to receiving the network traffic flow, whether the network traffic flow is associated with a teleconference session based on a source or a destination of one or more packet data units of the network traffic flow being associated with a known teleconference service;
    inspecting, in response to determining that the network traffic flow is associated with the teleconference session, a first teleconference session segment of the teleconference session to obtain a first feature tuple, wherein the first feature tuple is generated using information included in a header of one or more network traffic included in the network traffic flow, and wherein the network device is in a path of the teleconference session between the source and the destination of the network traffic flow, and wherein the first feature tuple is a collection comprising a plurality of values corresponding to different features of the teleconference session pertinent to determining a session quality of the teleconference session;
    processing the first feature tuple using a classification learning model to obtain a first quality classification of a plurality of configured quality classifications, wherein the processing of the first feature tuple is based on using only the first feature tuple and without being provided an explicit indication of the session quality of the teleconference session, and wherein the first quality classification provides a single label summarizing the session quality of the teleconference session; and
    providing, to an administrator device separate from the source device and the destination device, overall teleconference session metrics for the teleconference session reflecting the session quality of teleconference session based at least the processing of the first feature tuple, wherein the overall teleconference session metrics comprise the first quality classification.

2. The method of claim 1, wherein
the features of the teleconference session comprises at least one selected from a group consisting of a network traffic bit rate, a network traffic packet rate, a network traffic bit rate jitter, a network traffic packet rate jitter, and a transport layer protocol.

3. The method of claim 1, wherein the classification learning model is a support vector machine.

4. The method of claim 1, further comprising:
    prior to providing the overall teleconference session metrics to the device:
        aggregating a set of quality classifications, obtained throughout the teleconference session, comprising the first quality classification; and
        deriving a negative performance index for the teleconference session based on the set of quality classifications,
        wherein the overall teleconference session metrics comprise the negative performance index.

5. The method of claim 4, wherein the overall teleconference session metrics further comprise a root cause analysis result indicative of a root cause for the negative performance index.

6. The method of claim 4, further comprising:
    prior to aggregating the set of quality classifications:
        inspecting a second teleconference session segment of the teleconference session to obtain a second feature tuple; and
        processing the second feature tuple using the classification learning model to obtain a second quality classification,
        wherein when aggregated, the set of quality classifications further comprises the second quality classification.

7. The method of claim 5, wherein the root cause analysis result is obtained by:
    mapping a plurality of network traffic flow directionalities of the network traffic flow to the set of quality classifications;
    making a first identification, based on the mapping, of a portion of the network traffic flow directionalities associated with the negative performance index, wherein the portion of the network traffic flow directionalities is less than an entirety of the plurality of network traffic flow directionalities and includes only network traffic flow directionalities, among the plurality of network traffic flow directionalities, labeled with the negative performance index; and
    making a second identification, based on the first identification, of a mode of the portion of the network traffic flow directionalities, wherein the mode is one or more communications network connection types comprising a wired portion of a communications network and a wireless portion of the communications network.

8. The method of claim 5, wherein
the root cause analysis result associates one or more communications network connection types with the root cause for the negative performance index, and
the one or more communications network connection types comprises a wired portion and a wireless portion.

9. A system, comprising:
an administrator device comprising a first computer processor; and
a teleconference analytics service operatively connected to the administrator device, and comprising a second computer processor programmed to:
  receive a network traffic flow from a network device connected to the teleconference analytics service, wherein the network traffic flow is received during normal operation of the network;
  determine, in response to receiving the network traffic flow, whether the network traffic flow is associated with a teleconference session based on a source or a destination of one or more packet data units of the network traffic flow being associated with a known teleconference service;
  obtain, in response to determining that the network traffic flow is associated with the teleconference session, a feature tuple for a teleconference session segment of the teleconference session, wherein the feature tuple is generated using information included in a header of one or more network traffic included in the network traffic flow, and wherein the network device is in a path of the teleconference session between the source and the destination of the network traffic flow, and wherein the feature tuple is a collection comprising a plurality of values corresponding to different features of the teleconference session pertinent to determining a session quality of the teleconference session;
  process the feature tuple using a classification learning model to obtain a quality classification of a plurality of configured quality classifications, wherein the processing of the feature tuple is based on using only the feature tuple and without being provided an explicit indication of the session quality of the teleconference session, and wherein the quality classification provides a single label summarizing the session quality of the teleconference session; and
  provide, to the administrator device, overall teleconference session metrics for the teleconference session reflecting the session quality of teleconference session based at least on the processing of the feature tuple, wherein the overall teleconference session metrics comprise the quality classification, and the administrator device is separate from the source device and the destination device.

10. The system of claim 9, further comprising:
a sampling network device that operatively connects to the teleconference analytics service or comprises at least a portion of the teleconference analytics service, and is programmed to inspect the teleconference session segment of the teleconference session to obtain the feature tuple.

11. The system of claim 10, further comprising:
a teleconference service operatively connected to the sampling network device, and comprising a third computer processor programmed to manage real-time exchange of information during the teleconference session.

12. The system of claim 11, further comprising:
a communications network comprising the teleconference service and the sampling network device.

13. The system of claim 12, further comprising:
a pair of client devices operatively connected to one another through the communications network,
wherein communications exchanged between the pair of client devices comprise the network traffic flow for the teleconference session.

14. The system of claim 10, wherein the sampling network device is a switch, a router, or a multilayer switch.

15. A non-transitory computer readable medium (CRM) comprising computer readable program code, which when executed by a computer processor, enables the computer processor to:
  receive a network traffic flow from a network device on a network, wherein the network traffic flow is received during normal operation of the network;
  determine, in response to receiving the network traffic flow, whether the network traffic flow is associated with a teleconference session based on a source or a destination of one or more packet data units of the network traffic flow being associated with a known teleconference service;
  inspect, in response to determining that the network traffic flow is associated with the teleconference session, a first teleconference session segment of the teleconference session to obtain a first feature tuple, wherein the first feature tuple is generated using information included in a header of one or more network traffic included in the network traffic flow, and wherein the network device is in a path of the teleconference session between the source and the destination of the network traffic flow, and wherein the first feature tuple is a collection comprising a plurality of values corresponding to different features of the teleconference session pertinent to determining a session quality of the teleconference session;
  process the first feature tuple using a classification learning model to obtain a first quality classification of a plurality of configured quality classifications, wherein the processing of the first feature tuple is based on using only the first feature tuple and without being provided an explicit indication of the session quality of the teleconference session, and wherein the first quality classification provides a single label summarizing the session quality of the teleconference session; and
  provide, to an administrator device separate from the source device and the destination device, overall teleconference session metrics for the teleconference session reflecting the session quality of teleconference session based at least on the processing of the first feature tuple, wherein the overall teleconference session metrics comprise the first quality classification.

16. The non-transitory CRM of claim 15, wherein the features of the teleconference session comprises at least one selected from a group consisting of a network traffic bit rate, a network traffic packet rate, a network traffic bit rate jitter, a network traffic packet rate jitter, and a transport layer protocol.

17. The non-transitory CRM of claim 15, comprising computer readable program code, which when executed by the computer processor, further enables the computer processor to:

prior to providing the overall teleconference session metrics to the device:
  aggregate a set of quality classifications, obtained throughout the teleconference session, comprising the first quality classification; and
  derive a negative performance index for the teleconference session based on the set of quality classifications,
  wherein the overall teleconference session metrics comprise the negative performance index.

18. The non-transitory CRM of claim 17, wherein the overall teleconference session metrics further comprise a root cause analysis result indicative of a root cause for the negative performance index.

19. The non-transitory CRM of claim 17, comprising computer readable program code, which when executed by the computer processor, further enables the computer processor to:
  prior to aggregating the set of quality classifications:
    inspect a second teleconference session segment of the teleconference session to obtain a second feature tuple; and
    process the second feature tuple using the classification learning model to obtain a second quality classification,
    wherein when aggregated, the set of quality classifications further comprises the second quality classification.

* * * * *